Aug. 16, 1960 A. F. HICKMAN 2,949,153
SEAT STRUCTURE
Filed June 30, 1955 3 Sheets-Sheet 1
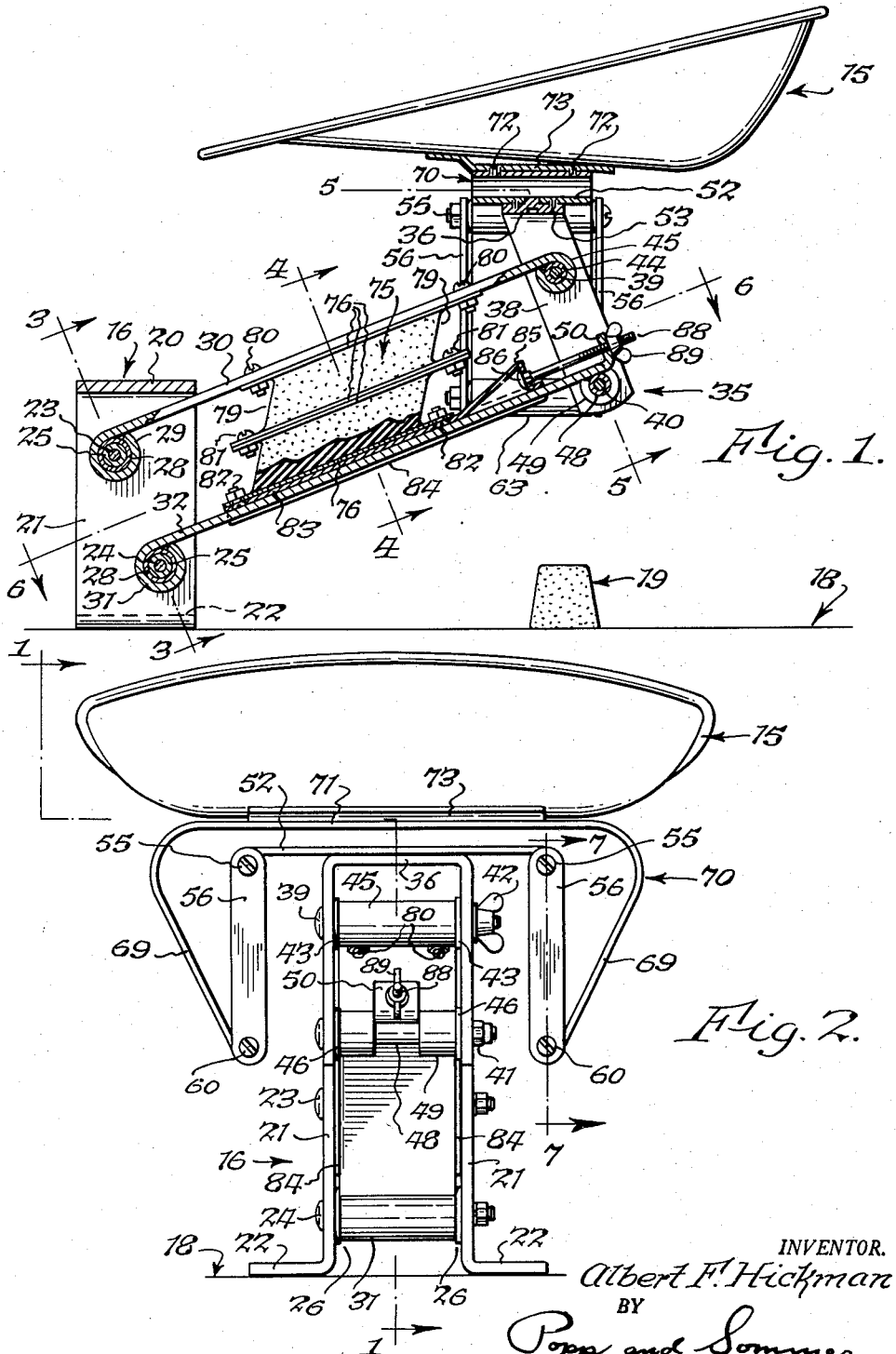
INVENTOR.
Albert F. Hickman
BY
Popp and Sommer
Attorneys.

Aug. 16, 1960   A. F. HICKMAN   2,949,153
SEAT STRUCTURE
Filed June 30, 1955   3 Sheets-Sheet 2
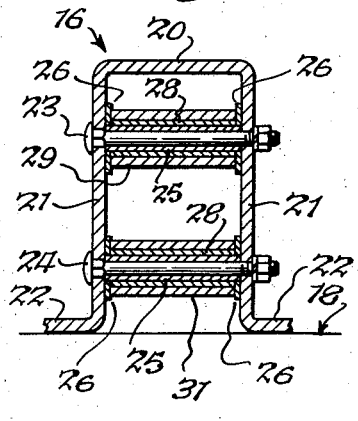
Fig. 3.
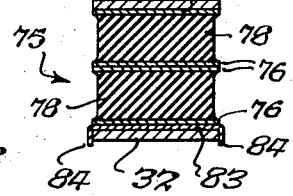
Fig. 4.
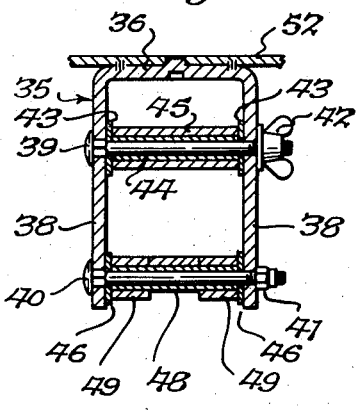
Fig. 5.
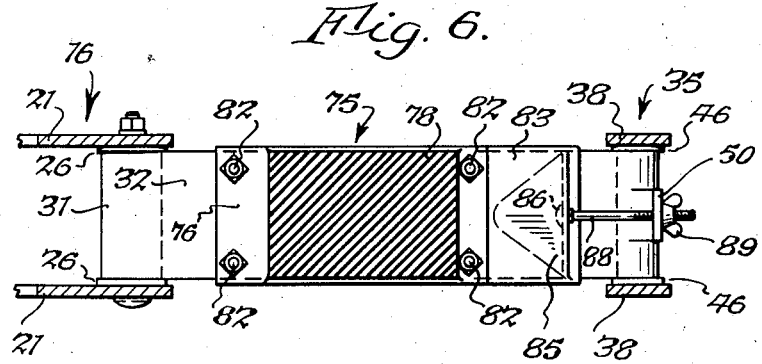
Fig. 6.
Fig. 7.
INVENTOR.
Albert F. Hickman
BY
Popp and Sommer
Attorneys Aug. 16, 1960    A. F. HICKMAN    2,949,153
SEAT STRUCTURE
Filed June 30, 1955    3 Sheets-Sheet 3
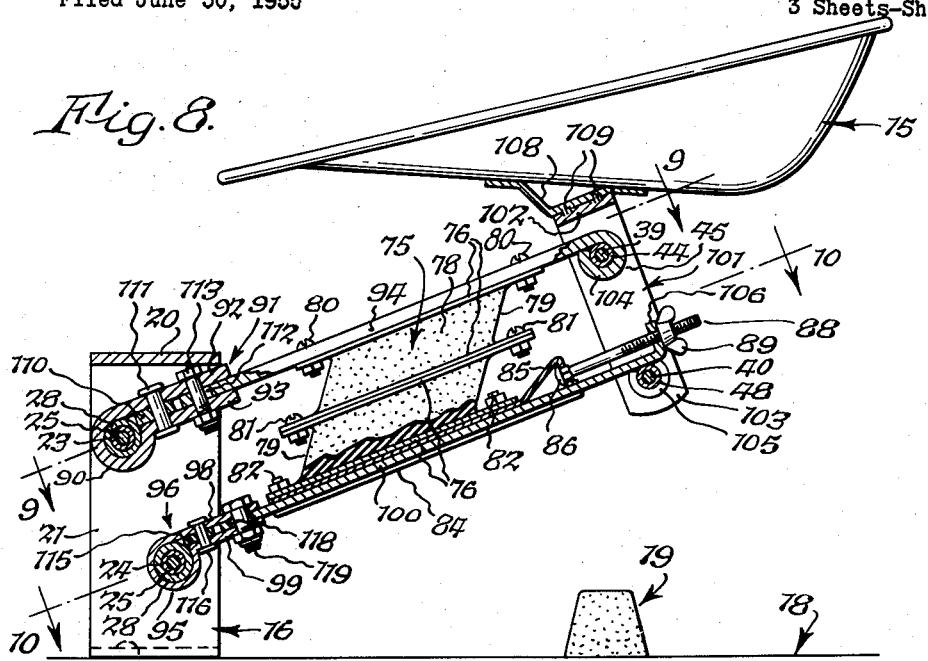
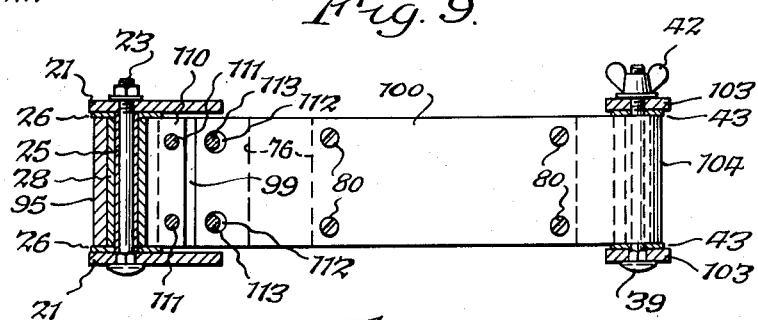
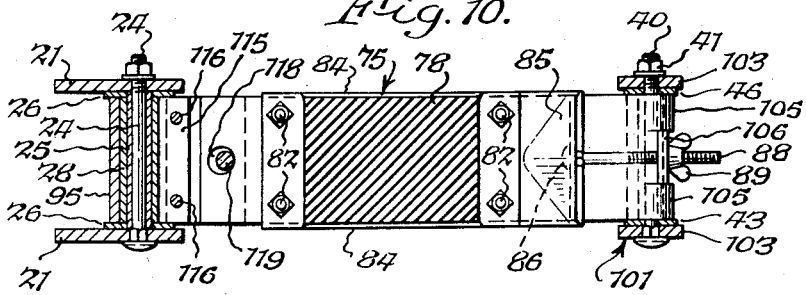
INVENTOR.
Albert F. Hickman
BY
Popp and Sommer
Attorneys.

United States Patent Office 2,949,153
Patented Aug. 16, 1960

2,949,153

SEAT STRUCTURE

Albert F. Hickman, Eden, N.Y., assignor to Hickman Industries, Inc., Eden, N.Y., a corporation of New York Filed June 30, 1955, Ser. No. 519,122

5 Claims. (Cl. 155—55)

This invention relates to a seat structure and more particularly to such a seat structure designed primarily for use with extremely rough riding vehicles such as farm tractors and military vehicles, features of the seat structure being capable of use in seat structures for railroad locomotives and highway trucks.

Important general objects of the present invention are to provide a seat structure (1) in which the vertical movement of the seat part is resisted by a constant rate of resilient resistance; (2) which provides the maximum safety and leaves the occupant in full control of all controls of the vehicle; (3) in which the seat moves with the occupant and is not drawn or jerked away from the occupant whenever the pressure imposed by the occupant upon the seat becomes negative; (4) which will operate in a highly desirable frequency range regardless of the weight of the occupant; (5) which can be designed, within practical limits, to have any desired frequency; (6) which reduces and cushions both vertical and lateral impacts without undue thrust on the connections between the seat part and the vehicle; (7) in which the load from the seat part to the suspension and from the suspension to the base part is distributed at a plurality of spaced points; (8) in which fore-and-aft and lateral tilting of the seat is prevented; (9) which is made of a small number of low-cost components which can be easily assembled; and (10) which is extremely compact and sturdy and which will stand up under conditions of severe and constant use with very little servicing.

A specific object of the present invention is to provide a seat suspension in which shear rubber springs of the rectilinear movement type provide the resilient resistance.

Another specific object of the present invention is to provide such a suspension in which, while the resilient resistance is at a substantially constant rate, the friction is not at a constant rate but in which the friction increases at a substantially greater rate than an increase in the load to provide a snubbing action.

Another object is to provide such a seat structure in which the friction diminishes in proportion to its build up as the load is relieved, there being no stored energy in this functioning of the seat structure.

Another object of the present invention is to provide such a seat structure in which the rapid build up in friction can be utilized in place of shock absorbers.

Another object of the invention is to provide such a suspension in which the amount of friction can be adjusted to suit the weight of the occupant.

Another object is to provide such a seat structure in which the seat part remains level at all elevations, being supported on a parallelogram linkage for this purpose.

Another object is to provide such a seat structure in which the rubber springs can be adjusted both to suit the weight of the occupant and also to obtain the riding height required by the occupant to put him in ready command of all controls.

Another object is to provide such a seat structure in which this adjustment to suit the weight and height of the driver is obtained without changing the operating characteristics of the spring suspension.

Another object is to provide such a seat structure in which the shear rubber springs act to cushion both downward and rebound movements of the seat structure and in which the friction builds up rapidly to check the dynamic forces in both downward and rebound movements.

Another object is to provide such a seat structure having a large spring deflection to obtain the desired spring frequency particularly with light loads.

Another object of the present invention is to provide such a suspension in which the shear rubber rectilinear movement type of springs are placed under increasing compression with increase in the load so as to automatically apply increasing bond pressure between the rubber bodies and the metal to which they are bonded.

Other objects and advantages of the invention will be apparent from the following description and drawings in which:

Fig. 1 is a fore-and-aft vertical section of an unloaded seat structure embodying the present invention and taken generally on line 1—1, Fig. 2 with parts being shown in elevation.

Fig. 2 is a rear elevational view thereof.

Figs. 3, 4, 5 and 6 are sectional views taken on the correspondingly numbered lines on Fig. 1.

Fig. 7 is a vertical section taken in line 7—7, Fig. 2.

Fig. 8 is a view similar to Fig. 1 and showing a modified form of the invention.

Figs. 9 and 10 are sectional views taken on the correspondingly numbered lines of Fig. 8.

The vehicle seat structure embodying the present invention is designed primarily for use where rough riding or extreme vertical and lateral impact conditions are encountered, such as with farm tractors, railroad locomotives and military vehicles where lateral as well as vertical resilience and stability are required, and to this end, the seat part 15 of the seat structure is shown as being in the form of a sheet metal bucket type of seat. This seat part 15 is supported on a base part 16 of the seat structure through the spring suspension embodying the present invention. This base part 16 is mounted in any suitable manner on the chassis 18 of the tractor and which is also shown as carrying an upstanding rubber bumper 19 against which the suspension bottoms.

The base part 16 is shown as being in the form of an inverted U-shaped metal bracket having a top cross part 20, parallel vertical side legs 21 and outwardly extending bottom flanges 22 which can be secured to the tractor 18 in any suitable manner. Upper and lower horizontal cross bolts 23 and 24 extend through the legs 21 of the base part 16 and form the supporting or base pivot pins for the parallelogram linkage of the present suspension. These horizontal supporting pivot pins or bolts 23, 24 are not in vertical alinement, one being offset forwardly with reference to the other. Each of these supporting bolts or pivot pins 23, 24 carries a metal sleeve 25 which is interposed between the legs 21 of the base part 16 and enlarges the effective diameter of its bolt. Each metal sleeve 25 carries washers 26 at its opposite ends and interposed between each pair of these washers and journalled on the corresponding sleeve 25 is a bearing bushing 28. This bearing bushing 28 is preferably made of lubricant impregnated sintered metal.

The upper bearing bushing 28 is embraced by a cylindrical knuckle 29 formed at one end of the upper link or strap 30 of the parallelogram linkage. The lower bearing bushing 28 is embraced by a cylindrical knuckle 31 formed at the corresponding end of the lower link or strap 32 of the parallelogram linkage.

The parallelogram linkage is completed by an inverted U-shaped metal bracket 35 which is preferably made of a metal strap and has a horizontal cross part 36 and depending parallel legs 38. Preferably, in the unloaded position of the seat structure as shown in Fig. 1, these legs are not vertical in a fore-and-aft direction but extend parallel with the plane intersecting the axes of the supporting pivot bolts 23, 24 and which plane is indicated by the line 3—3, Fig. 1. An upper and a lower horizontal bolt 39, 40 extend through the side legs 38 of the U-shaped bracket 35. These bolts form pivot pins for the parallelogram linkage and one is shown as provided with a shake-proof or elastic stop nut 41 whereas the other is provided with a wing nut 42. The purpose of the wing nut 42 is to permit of adjusting the friction imposed upon the suspension as hereinafter described.

The upper bolt 39 has washers 43 at its opposite ends, these washers being arranged against the inner faces of the side legs 38 of the bracket 35. A bearing bushing 44 is interposed between these washers 43 and surrounds and rotates on the shank of the bolt 39. This bearing bushing is also preferably made of lubricant impregnated sintered metal and is in turn embraced by a knuckle 45 formed at the corresponding end of the upper parallelogram link or strap 30.

Similarly, the lower pivot bolt 40 carries a pair of washers 46 disposed against the inner faces of the legs 38 of the bracket 35 and interposed between these washers and rotating on the shank of the pivot bolt 40 is a bearing bushing 48 preferably of lubricant impregnated sintered metal. This bearing bushing 48 is embraced by two spaced knuckles 49 provided at the end of the lower link or strap 32 of the parallelogram, these knuckles 49 bearing against the washers 46, and the metal from the space between these knuckles 49 being bent upwardly to form an ear 50 which projects at right angles to the lower link or strap 32 of the parallelogram linkage for a purpose which will presently appear.

A cross plate or strap 52 is secured, as by weldings 53, to the cross part 36 of the bracket 35, this cross plate or strap 52 being horizontally disposed. As best shown in Fig. 7, each end of this horizontal cross plate or strap 52 is formed to provide a horizontal tubular knuckle 53' which embraces a bearing bushing 54 which is again preferably made of a lubricant impregnated sintered metal. Each bearing bushing 54 rotates on a pivot pin in the form of a horizontal bolt 55 extending fore-and-aft and this bolt 55 carries a pair of depending links 56 at its opposite ends, a washer 58 being preferably interposed between each of these depending links 56 and the corresponding end of the bearing bushing 53' and knuckle 54.

These links 56 are of such length as to provide the desired frequency of the seat structure in a lateral direction, these links acting in the manner of pendulums and for this purpose, fore-and-aft horizontal bolts 60 connect the lower ends of each pair of links 56. Each bolt 60 is provided with a pair of washers 61 severally engaging the inner faces of the links 56 and between each pair of washers each bolt 60 rotatably supports a bearing bushing 62 also preferably made of a lubricant impregnated sintered metal. Each bearing bushing 62 is embraced by a tubular knuckle 63 provided at the lower end of a corresponding leg 69 of an inverted U-shaped bracket 70. The horizontal cross part 71 of the seat bracket 70 has welded, as indicated at 72, to its upper face, a plate 73 which can be, in turn, secured in any suitable manner to the underside of the bucket seat 15.

An important feature of the invention is that the resilient resistance for vertical movement of the seat 15 is provided by a pair of rectilinear movement shear rubber springs indicated generally at 75 and each comprising a pair of plates 76 to the opposing faces of which is vulcanized a block or body 78 of rubber. These bodies of rubber are preferably rectilinear in a section taken parallel with its plates 76 but in a plane at right angles to the plates 76 the bodies of rubber are of non-rectangular parallelogram form with the end faces of the rubber bodies inclined in the direction through which force is applied through the rubber bodies. This inclination of these end faces 79 is such that when pressure is applied through the rubber body, these end faces are first brought to a generally perpendicular position with reference to its plates 76 and then stressed so as to incline in the opposite direction. By this means maximum movement of each pair of plates 76 longitudinally with reference to each other is permitted since the rubber bodies move from a position of inclination in one direction to a position of inclination in the opposite direction.

Each plate 76 is provided at its four corners with bolt holes through which bolts pass. The uppermost plate 76 is secured by bolts 80 to the upper link or strap 30. Two of the plates 76 of the rubber springs are bolted together by bolts 81 so that the rubber bodies 78 act in series in resisting movement. The lower plate 76 is secured by bolts 82 to a slide plate 83.

This slide plate rests upon and slides longitudinally along the lower link or strap 32 and is guided in this movement by depending side flanges 84 which ride along opposite edges of this lower link or strap 32 as best shown in Fig. 4. At its end toward the bucket seat 15, the slide 83 is provided with a raised boss 85 which forms the anchorage for the head 86 of a screw 88, the neck of this head being hexagonal or out-of-round and secured in a similarly shaped opening in the boss 85 so that the screw 88 cannot turn. The threaded end of the screw 88 extends through an unthreaded opening in the ear 50 and has a wing nut 89 applied thereto. Upon turning this wing nut, the slide 83 is moved lengthwise of the lower link or strap 32 to provide the desired degree of pretensioning or "windup" of the two rubber bodies 78 to suit the weight of the driver as well as his height, that is, to insure that the normal elevation of the seat for the particular driver will be such that all tractor controls are conveniently within reach.

In the operation of the form of invention shown in Figs. 1–7, upward movement of the tractor 18 on encountering a bump, through the inertia of the person seated upon the bucket seat 15, causes relative downward movement of the bucket seat 15. Through the seat bracket 70, links 56, and cross plate 52, this effects downward movement of the inverted U-shaped bracket 35. This bracket forms one side of a parallelogram linkage completed by the links or straps 30, 32 and the inverted U-shaped metal bracket forming the base part 16. Accordingly, such downward movement of the bucket seat 15 causes a change in angularity of the parallelogram linkage, this causing relative longitudinal movement of the links or straps 30, 32, the movement of the upper link or straps 30 being to the left as compared with movement of the lower strap to the right as viewed in Fig. 1.

This relative longitudinal movement of these links or straps 30, 32 of the parallelogram linkage thereby imposes a shear force on the rubber bodies 78 of the rectilinear movement type shear rubber springs 75. This force first distorts these rubber bodies from the non-rectangular elevational form as viewed in Fig. 1, the right and left end faces perpendicular to the line of force being brought into perpendicular relation to the links or straps 30, 32. Upon sufficient force being applied to these rubber springs 75, they are distorted so as to incline in the opposite direction from that shown in Fig. 1, the end faces prependicular to the line of force applied to the rubber bodies being arranged to incline upwardly and to the left instead of upwardly and to the right as viewed in Fig. 1.

Following the impact which caused this downward movement of the seat 15 with reference to the tractor 18, the rubber springs 75 react to elevate the occupied bucket seat 15. In so elevating the occupied bucket seat 15, the rubber springs 75 return toward their normal position as viewed in Fig. 1.

Lateral impacts from the tractor 18 to the seat part 15 are also cushioned. In the form of the invention shown in Figs. 1–7, this lateral cushioning is provided by the links 56 which act in the manner of pendulums to provide the desired frequency of the lateral cushioning. These links 56 permit movement of the seat part 15 laterally of the tractor 18 but tend to maintain the seat part 15 in the centered relation shown in Fig. 2. The greater the length of these links 56, the lower the cushioning frequency laterally.

The pretensioning of the rubber springs can be adjusted, this pretensioning being to suit not only the weight of the occupant of the bucket seat 15 but also his height. The upward movement of the seat part 15 is limited by engagement of the upper link or strap 30 with the cross part 20 of the inverted U-shaped metal bracket forming the base part 16 of the suspension. When the occupant sits on the bucket seat 15, it moves downwardly distorting the shear rubber bodies 78 of the rubber springs 75 in a direction parallel with the links or straps 30, 32. If these rubber springs 75 are too soft to suit the weight of the occupant, he turns the wing nut 89 so as to draw the slide plate 83 to the right as viewed in Fig. 1. This moves the base of the two rubber springs 75 to the right and since under load these rubber springs are stressed to the left, all as viewed in Fig. 1, this increases the pretensioning of these rubber springs so as to increase their resistance to load and to adapt them to a heavier occupant.

At the same time, this increase in the pretensioning of these rubber springs 75 raises the bucket seat 15. Accordingly, this pretensioning also provides an adjustment of the height of the bucket seat 15 to suit the height of the driver. Thus, if the driver is long legged, he would adjust the wing nut 89 to increase the pretensioning of the rubber spring 75 to the point that when seated on the bucket seat 15, his body is at an increased distance from the controls of the tractor so that they can be easily operated by his longer legs. A driver with shorter legs would turn the wing nut 89 so as to decrease the pretensioning of the rubber spring 75 thereby to carry the driver at a lower elevation better suited to his shorter legs.

An important feature of the invention is that while the resilient resistance to vertical impacts provided by the rubber spring 75 is at a substantially constant rate, the friction in the suspension is not at a constant rate, but increases at an accelerated rate in relation to the load. The friction thereby provides an action which, under normal conditions, eliminates the necessity for shock absorbers. Thus, under light impacts, only a small degree of friction is impressed upon the suspension to snub its action. Under heavy impacts a much greater amount of friction is impressed upon the suspension. Accordingly, movement of the suspension is frictionally resisted at a varying rate, this variable rate of friction being effective both against direct impacts and also during rebound movement of the suspension. The ratio of the rate of increase of the frictional resistance to the increase in force or load applied to the suspension as illustrated is four to one.

This ratio of increase of frictional resistance to the load or vertical force impressed upon the suspension is determined by the ratio of the length of the links or straps 30, 32 to the length of the parallelogram links provided by the brackets 16, 35. Thus, in the seat structure illustrated, the spacing between the pivots 23, 39 and 24, 40 is four times the spacing of the pivot 23 from the pivot 24 and of the pivot 39 from the pivot 40. This accelerated rate of increase of frictional resistance is provided at the two pivots 23 and 24 on the base part 16 of the seat structure. Thus, the frictional resistance in the pivots 39, 40 at the seat end of the parallelogram linkage increases approximately in proportion to the load, whereas the frictional resistance in the pivots 23 and 24 at the fulcrum or base end of the parallelogram linkage increases at a rate of approximately four times the increase in the load because the links 30, 31 are four times the length of the distance between the pivots 23 and 24. It is desirable, to provide this friction, that friction bearings be provided for these pivots 23 and 24 as shown. If these bearings were made of rubber, the rubber bushings would raise the vertical spring frequency of the seat; they would tend to make the suspension a variable rate spring suspension; and they would not provide the requisite friction to act in a shock absorbing capacity. The shock absorbing effect would also not be present with antifriction bearings, of course.

This rapid build-up of friction in relation to the load works both on downward and rebound movement of the seat and also the rate of decrease of the frictional resistance as the load is relieved is the same as the rate of increase of the frictional resistance as the load is applied. Assuming the 4 to 1 ratio between the parallelogram pivot centers 23, 24 in relation to the pivot centers 39, 40, 100 lbs. of static load on the seat 15 would place 400 lbs. of bearing load on the base bearings 23, 24 because of this 4 to 1 ratio in the parallelogram linkage. At the same time the bearings 39, 40 at the seat end of the parallelogram linkage would have 50 lbs. load each. Add to this 100 lbs. of static load, another 100 lbs. of dynamic load and the base bearings 23, 24 would have a load of 800 lbs. (400 static and 400 dynamic), while the bearings 39, 40 at the seat end of the parallelogram linkage would have only 200 lbs. each (100 lbs. static and 100 lbs. dynamic). Since friction is dependent on bearing loads, the increase of the frictional resistance of the base pivots 23 and 24 will be seen to be in the ratio of 4 to 1 as compared with the load on the seat.

It is desirable that the friction resistance of one of these bearings 23, 24 at the seat end of the parallelogram linkage (and which have relatively constant frictional characteristics) be adjustable and to this end the wing nut 42 is provided. Through the thrust washer 43, this increases the friction on the pivot 39 to provide the degree of shock absorbing action which the driver requires.

With the present invention the resilient resistance is provided by the block like rubber springs 75 of the shear rubber rectilinear movement type. With such springs incorporated between the two opposite links or bars 30, 32 of a parallelogram linkage as shown a very uniform spring frequency is obtained with widely different loads as exemplified by the following chart from which it will be observed that even with only 100 lbs. of load the low frequency of 84 cycles per minute is obtained with a 5 inch deflection.

| Load, pounds | Seat Deflection, inches | Frequency, c.p.m. |
|---|---|---|
| 100 | 5 | 84 |
| 150 | 7½ | 69 |
| 200 | 10 | 60 |
| 250 | 12½ | 53 |

Also a constant low frequency lateral cushioning can be obtained by selecting a corresponding length for the pendulum links 56.

By having, when in stress, the rubber blocks 79 of the non-rectangular parallelogram vertical outline in the direction of the force applied thereto, as shown in Fig. 1, these rubber blocks can be distorted to a high degree without excessive bond stresses. Thus, they can be brought progressively to a rectangular outline and then to a parallelogram outline slanted in the opposite direction from that shown in Fig. 1. It will also be observed that since downward movement of the seat tends to bring the links or bars 30, 32 closer together, the application of the load increases bond pressure between the faces of the rubber blocks 79 and their plates 76, 78, thereby to reduce bond failures.

The form of the invention shown in Figs. 8–10 differs from the form of the invention shown in Figs. 1–7 essentially in the manner in which lateral cushioning of the seat structure is provided. As with the form of the invention shown in Figs. 1–7, the seat part 15 of the seat is shown as being in the form of a sheet metal bucket type of seat, and this seat part is supported on a base part 16 mounted on the chassis of the tractor 18, the chassis also carrying the upstanding rubber bumper 19 against which the seat structure bottoms.

As with the form of the invention shown in Figs. 1–7, the base part 16 is shown as being in the form of an inverted U-shaped metal bracket having a top cross part 20, parallel vertical side legs 21 and outwardly extending bottom flanges 22 which can be secured to the tractor 18 in any suitable manner. Also, upper and lower cross bolts 23 and 24 extend through the legs 21 of the base part 16 and form the supporting pivot pins for a parallelogram linkage. These horizontal supporting pivot pins or bolts 23, 24 are not in vertical alinement, one being offset forwardly with reference to the other. Each of these supporting bolts or pivot pins 23, 24 carries a metal sleeve 25 which is interposed between the legs 21 of the base part 16 and enlarges the effective diameter of its bolt. Each sleeve 25 carries washers 26 at its opposite ends and interposed between each pair of these washers and journalled in the corresponding sleeve 25 is a bearing bushing 28. This bearing bushing 28 is preferably made of lubricant impregnated sintered metal.

The bearing bushing 28 for the metal sleeve 25 of the upper pivot pin 23 is clamped in the cylindrical knuckle or bend 90 of a hinge plate 91 which has a pair of spaced parallel rigid leaves 92 and 93 between which is interposed the end of an upper link or bar 94. Similarly, the bearing bushing 28 on the sleeve 25 of the lower pivot pin or bolt 24 is embraced by the cylindrical knuckle or bend 95 of a hinge plate 96 having a pair of spaced parallel rigid leaves 98 and 99 between which is interposed the end of a lower link or bar 100.

These links or bars 94, 100 are connected at their seat ends by an inverted U-shaped metal bracket 101 which is preferably made of metal and has a cross part 102 and depending parallel legs 103. Preferably, in the unloaded position of the seat structure as shown in Fig. 8, these legs are not vertical but extend parallel with a plane intersecting the axes of the supporting pivot 23, 24. Upper and lower horizontal bolts 39, 40 extend through the side legs of the U-shaped bracket 101. These bolts form pivot pins for the parallelogram linkage and one is provided with a conventional nut 41 whereas the other is provided with a wing nut 42. The purpose of the wing nut 42 is to permit of adjusting the friction imposed upon the suspension in the same manner as with the form of the invention shown in Figs. 1–7.

The upper bolt 39 has washers 43 at its opposite ends, these washers being arranged against the inner faces of the side legs 103 of the bracket 101. A bearing bushing 44 is interposed between these washers 43 and rotates on the shank of the bolt 39. This bearing bushing is also preferably made of lubricant impregnated sintered metal and is in turn embraced by a knuckle 104 formed at the corresponding end of the upper parallelogram link or bar 94. Similarly, the lower pivot bolt 40 carries a pair of washers 46 disposed against the inner faces of the legs 103 of the bracket 101 and interposed between these washers and rotating on the shank of the pivot bolt 40 is a bearing bushing 48 preferably made of lubricant impregnated sintered metal. This bearing bushing is embraced by two spaced knuckles 105 provided at the end of the lower link or bar 100 of the parallelogram, these knuckles 105 bearing against the washers 46 and the metal from the space between these knuckles 105 being bent upwardly to form an ear 106 which projects at right angles to the lower link or bar 100.

A bracket 108 is secured, as by welding 109, to the cross part 102 of the bracket 101 and this cross plate or bracket 108 can be secured in any suitable manner directly to the underside of the bucket seat 15 in any suitable manner.

As with the form of the invention shown in Figs. 1–7, a pair of rubber springs 75 are interposed in series relation to each other between the upper and lower links or bars 94, 100 of the parallelogram linkage to provide the resilient resistance for the seat structure. Since the form, mounting and adjustment of these rubber springs is identical with the form of the invention shown in Figs. 1–7, this description is not repeated and the same reference numerals have been employed.

As previously indicated, the form of the invention shown in Figs. 8–10 differs from the form of the invention shown in Figs. 1–7 essentially in the manner whereby lateral cushioning is provided. Thus, in place of the seat bracket 70 and pendulum links 56 of the form of the invention shown in Figs. 1–7, a self-centering pivotal connection is provided between each of the parallelogram links or bars 94, 100 and the rigid leaves of their respective supporting hinge members 91, 96. With the upper hinge member 91, its rigid leaves 92, 93 are held in spaced parallel relation to snugly receive the corresponding end of the link or bar 94 by a spacer bar or plate 110 held in place by a pair of rivets 111. In this space between the leaves 92, 93 provided by this spacer plate 110 the corresponding end of the link or bar 94 is slidingly fitted and is provided at its opposite sides with a pair of oversize holes 112 as shown in Fig. 9. These oversize holes are arranged transversely in line with each other and through each, a bolt 113 extends, these bolts also extending through the leaves 92, 93 of the hinge member 91 as best shown in Fig. 8. An important feature is that the shanks of these bolts 113 are smaller than the holes 112 so as to permit a limited lateral horizontal movement of the seat end of the upper bar or link 94.

A spacer plate or bar 115 is interposed between the inner ends of the rigid leaves 98 and 99 of the hinge member 96 to hold these leaves in parallel spaced relation. This relation is maintained by a pair of rivets 116 extending through these leaves and spacer bar 115. This spacer bar holds these rigid leaves 98 and 99 spaced to receive snugly the corresponding end of the lower link or bar 100. Between these leaves 98, 99, this lower link or bar 100 is provided with a central oversize hole 118 through which a bolt 119 extends. As best shown in Fig. 8, this bolt extends through the leaves 98, 99 of the hinge member 96 and the oversize hole 118 permits a limited lateral horizontal movement of the seat end of the lower link or bar 100 of the parallelogram linkage.

It will be seen that except for its lateral movement, the seat forming the subject of the form of the invention shown in Figs. 8–10 is the same as with the form of the invention shown in Figs. 1–7 and hence this description is not repeated. However, when a lateral force is impressed against the seat part 15, this horizontal lateral force is transmitted to the upper and lower links or bars 94, 100 which are anchored through their oversize holes 112 and 118 respectively on the bolts 113 and 119. Such lateral force in a horizontal direction against the upper link or bar 94, Fig. 9, tends to cause the holes 112 to shift laterally with reference to the pins 113 and to engage different parts of the margins of these holes with these pins 113. Similarly, in Fig. 10, such lateral horizontal shifting of the outer end of the lower link or bar 100 causes a sliding lateral displacement of its hole 118 with reference to the pin 119 thereby to cause this pin to engage a different part of the rim of the enlarged hole 118. The fact of the oversize of these holes permits the required small lateral movement of the seat part 15 under a horizontal transverse force, but it will be noted that this movement is cushioned since the weight of the occupant of the seat 15 tends to hold the pins 113 and 119 in the centered relation to the oversize holes 112 and 118 exactly as shown in Figs. 9 and 10 and hence tends to return the parts to the centered position illustrated.

It will be seen that in its broadest aspect the present invention comprises a seat structure having the seat part 15, the base part 16, a first bar or link 30 operatively connected with the seat part 15, a second bar or link 32 operatively connected with the base part 16, with these bars being moved longitudinally with respect to each other in response to vertical movement of the seat part 15 with reference to the base part 116, and the rubber body 78 of at least one rubber spring 75 being interposed between and operatively connecting the bars 30 and 32 and having opposite portions stressed in opposite directions by the relative movement of the bars 30, 32 when a load is applied to the seat part 15.

It will further be seen that in its narrower aspect the base part is in the form of the base bracket 16, the parallel bars 30, 32 are arranged one above the other and are each pivotally connected at one end to the base bracket 16 and to the other end to the seat bracket 35 to form a vertically movable parallelogram linkage with the shear rubber springs 75 interposed between the bars 30, 32.

From the foregoing, it will be seen that the present invention provides a very simple and compact seat structure for use with very rough riding vehicles which is of low cost and trouble proof design and which is simple in its mounting and employs simple and effective shear rubber rectilinear movement type of rubber bodies to provide the resilient resistance. It will further be seen that the spring suspension operates in a very desirable frequency range and that lateral cushioning can be provided, and the structure is fully adjustable both to suit the weight and height of the driver as well as to obtain the most desirable frictional effect in absorbing shocks. It will also be seen that through its frictional characteristics, the seat structure has a shock absorbing action without conventional shock absorbers.

I claim:

1. A seat structure comprising a base bracket having spaced upright side walls, a pair of horizontal transverse pivot pins extending through said side walls and bridging the space therebetween, one of said pivot pins being arranged above and in advance of the other pivot pin, an upper bar having its front end journalled on said one of said pivot pins, a lower bar parallel with said upper bar and having its front end journalled on said other pivot pin, a seat bracket having spaced upright side walls embracing the rear ends of said bars, an upper horizontal transverse pivot pin extending through said side walls of said seat bracket and pivotally supported on the rear end of said upper bar, a lower horizontal transverse pivot pin extending through said side walls of said seat bracket and pivotally supported on the rear end of said lower bar below and in rear of said last pivot pin, a rubber body interposed between said upper and lower bars, a pair of plates vulcanized to the opposite upper and lower sides of said rubber body, means securing one of said plates to one of said bars, and means adjustably securing the other of said plates at different positions along the other of bars whereby the upper and lower portions of said rubber body are stressed essentially rectilinearly in shear in opposite directions lengthwise of said bars by the relative longitudinal movement of said bars when a load is applied to said seat part.

2. A seat structure for a moving vehicle comprising a base part, a pair of generally parallel bars spaced one above the other, hinge plates severally arranged at corresponding ends of said bars, means severally pivotally connecting said hinge plates to said ends of said bars comprising pivot pins extending through over-size holes to permit limited lateral swinging horizontal movement under the influence of lateral impacts encountered in normal use of the vehicle of the opposite ends of said bars relative to said hinge plates, said pivot pins and over-size holes being arranged so that said seat part is self-centering with reference to said base part horizontal pivots severally connecting said hinge plates to said base part to swing about generally parallel axes, a seat part, a bracket supporting said seat part and arranged adjacent said opposite ends of said bars, pivots severally connecting said opposite ends of said bars to said bracket to swing about generally horizontal axes arranged generally parallel with said horizontal pivots connecting said hinge plates and base part, and means yieldingly resisting downward movement of said seat part relative to said base part.

3. A seat structure comprising a base part, a pair of generally parallel bars spaced one above the other, pivots severally connecting corresponding ends of said bars to said base part to swing about generally horizontal, generally parallel axes, a seat part, a bracket supporting said seat part and arranged adjacent the other end of each of said bars, pivots having axes generally parallel with the axes of said first pivots and severally connecting said other ends of said bars to said bracket, a rubber body interposed between said bars and also interposed between a pair of plates vulcanized to opposite sides thereof, means arranged to secure one of said plates to one of said bars, and means adjustably securing the other of said plates at different positions along the other of said bars whereby opposite portions of said rubber body are stressed essentially rectilinearly in shear in opposite directions by the relative longitudinal movement of said bars when a vertical load is applied to said seat part and whereby the degree of resilient resistance by said rubber body to said load can be adjusted.

4. A seat structure comprising a base part, a pair of generally parallel bars spaced one above the other, pivots severally connecting corresponding ends of said bars to said base part to swing about generally horizontal, generally parallel axes, a seat part, a bracket supporting said seat part and arranged adjacent the other end of each of said bars, pivots having axes generally parallel with the axes of said first pivots and severally connecting said other ends of said bars to said bracket, a rubber body interposed between said bars and also interposed between a pair of plates vulcanized to opposite sides thereof, means arranged to secure one of said plates to one of said bars, means arranged to guide the other of said plates longitudinally along the other of said bars, a manual adjusting screw extending lengthwise of said other of said bars, and means operatively connecting said adjusting screw with said other of said plates and said other of said bars to adjustably position the same with reference to each other whereby opposite portions of said rubber body are stressed essentially rectilinearly in shear in opposite directions by the relative longitudinal movement of said bars when a vertical load is applied to said seat part and whereby the degree of resilient resistance of said rubber body to said load can be adjusted.

5. A seat structure as set forth in claim 4 wherein said guide means includes side flanges on said other of said plates riding along the sides of said other of said bars.

References Cited in the file of this patent

UNITED STATES PATENTS

| | | |
|---|---|---|
| 1,524,264 | Lee | Jan. 27, 1925 |
| 2,452,280 | Zahller | Oct. 26, 1948 |
| 2,489,981 | Rose | Nov. 29, 1949 |
| 2,528,607 | Preising et al. | Nov. 7, 1950 |
| 2,667,209 | Gundersen | Jan. 26, 1954 |

FOREIGN PATENTS

| | | |
|---|---|---|
| 436,718 | France | Apr. 3, 1912 |
| 612,702 | Great Britain | Nov. 16, 1948 |
| 635,888 | Great Britain | Apr. 19, 1950 |
| 859,565 | Germany | Dec. 15, 1952 |
| 915,898 | Germany | July 29, 1954 |